INVENTORS
CALVIN N. DeBRUIN, LEO C. BURNS
& FRANK G. WARRICK

ATTORNEYS.

United States Patent Office 3,105,695
Patented Oct. 1, 1963

3,105,695
PISTON RING ASSEMBLY
Leo C. Burns, Frank G. Warrick, and Calvin N. DeBruin, Muskegon, Mich., assignors to Sealed Power Corporation, Muskegon, Mich., a corporation of Michigan
Filed Mar. 13, 1961, Ser. No. 95,221
13 Claims. (Cl. 277—79)

This invention relates to piston rings and more particularly to an oil ring assembly for use in the oil groove of a piston subject to a circumferentially uneven rate of accumulation of oil in such groove.

In certain automotive engines the cylinders are arranged with their axes at an angle relative to the vertical longitudinal plane of the chassis. Some examples of engines having non-vertical cylinders are the V-type and horizontally opposed engines, and the recently developed "tilted" in-line engines used in the so-called "compact" automobiles. This non-vertical cylinder orientation causes lubricating oil which is thrown from the bearing surfaces and moving parts during operation of the engine to accumulate in larger quantities on the lower side of the cylinder. Similarly, when the engine is shut down the oil tends to drain to the lower side of the oil ring groove of the piston. Hence when the parting gap of the oil ring assembly is in the lower portion of the oil groove it creates a serious oil loss problem, particularly when the engine is idling or running at high-vacuum light load conditions, due to this excess oil being sucked through the gap and into the combustion chamber. This in turn causes spark plug fouling after long periods of engine idling and excessive smoking when the engine is first started.

It is therefore an object of the present invention to provide an improved oil ring assembly which reduces the problems of excessive oil consumption, excessive smoking and spark plug fouling in cylinders having a side subjected to excess oil accumulation.

Another object is to provide an improved oil ring assembly of economical construction which is easy to assemble and which remains fixed against rotation relative to the piston in which it is disposed during operation of the engine.

A further object is to provide an improved expander-spacer for use in a composite oil ring assembly which is operative to angularly position the cylinder-wall-engaging elements associated therewith relative to the piston without increasing the cost of the assembly.

Figure 1:
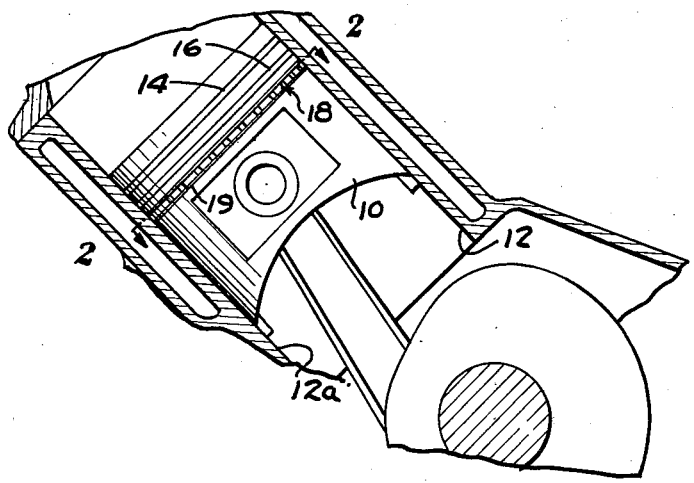
FIG. 1 is a fragmentary view of a piston embodying an oil ring assembly of the invention and located in an engine cylinder oriented with its axis at an angle to the vertical.

Referring in more detail to the drawing, FIG. 1 illustrates a cut-a-way portion of an engine having a piston 10 adapted to reciprocate in a cylinder 12 the axis of which is a non-vertical position. One example of such an engine is that manufactured by Chrysler Corporation for use in the Dart automobile, which engine is a 6-cylinder inline engine mounted at an inclination of about 30° from the vertical longitudinal plane of the chassis. Piston 10 is provided with conventional compression rings 14 and 16 located in the upper and middle circumferential ring grooves thereof, while an oil ring assembly 18 in accordance with the invention is shown mounted in the lowermost oil groove 19 of the piston. It will be apparent from FIG. 1 that during engine operation the lower inclined side 12a of cylinder 12 is subjected to a higher rate of oil accumulation than is the opposite, upper side of the cylinder, the same being true of the lower side of the interior of piston 10.

Figure 2:
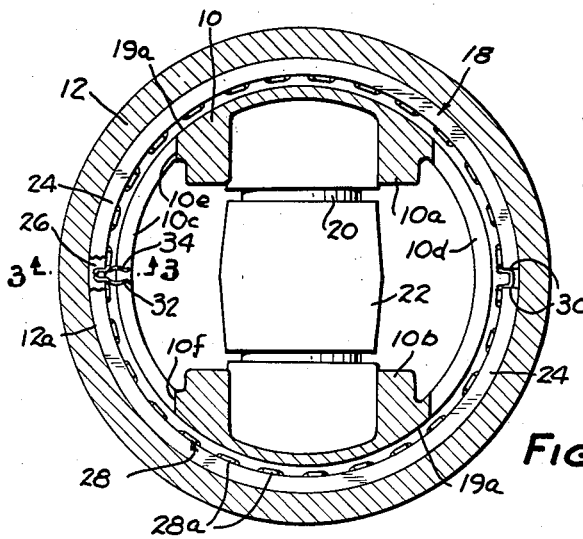
FIG. 2 is an enlarged plan view of the oil ring assembly of the invention taken in section on the line 2—2 of FIG. 1 with a portion of the upper rail of the assembly broken away.

As shown in the top view of FIG. 2, piston 10 has a hollow interior into which a pair of opposed bosses 10a, 10b extend to support a wrist pin 20 journalled on a longitudinal axis therein for connection to a connecting rod 22. A pair of relatively wide oil drainage passages 10c and 10d are formed opposite one another in piston 10 which extend from the interior thereof radially outward so as to open into the vertical bottom surface 19a of oil groove 19. It is to be noted that since the axis of wrist pin 20 must be parallel with the axis of the crankshaft of the engine, the most feasible locations for oil drainage slots 10c and 10d are in the lower and upper sides respectively of piston 10.

Figure 3:
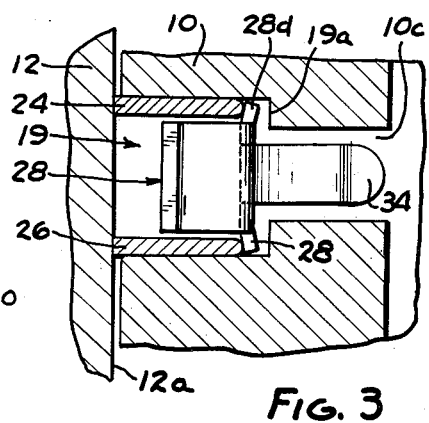
FIG. 3 is a further enlarged fragmentary elevational view of such assembly taken in section on the line 3—3 of FIG. 2.

The oil ring assembly 18 of the invention includes at least one but more commonly a pair of annular, flat parted steel rails 24 and 26 (FIGS. 2 and 3) and an intermediate expander-spacer structure 28 which spaces rails 24 and 26 axially apart and urges the same radially outward into oil sealing engagement with the wall of cylinder 12. Rails 24, 26 are of conventional split construction so that a gap 30 is formed between the parted ends of rails 24, 26 even after the rails are assembled into oil groove 19 and are circumferentially compressed by the wall of cylinder 12. If rails 24, 26 were to rotate relative to piston 10 as in conventional ring assemblies, a substantial quantity of oil would be drawn through the parting gaps 30 of the rails when the gaps are between the lower oil drainage slot 10c and the lower inclined side 12a of cylinder 12. Accordingly, in the present invention each rail 24, 26 is assembled with its parting gap 30 initially located in the highest portion of oil groove 19, between oil passage 10d and the uppermost side of cylinder 12. Once a rail is assembled in this position it has been found that it will remain substantially in such position during engine operation so long as expander-spacer 28 does not rotate relative to piston 10. The present invention provides structure adapted to maintain expander-spacer 28 relatively fixed against rotation with respect to the piston to thereby maintain the above initial assembled position of rails 24 and 26.

Figures 4, 5:
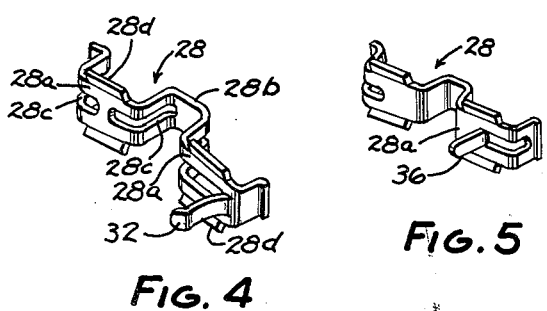
FIG. 4 is an enlarged fragmentary perspective view of an expander-spacer constructed in accordance with the present invention.
FIG. 5 is an enlarged fragmentary perspective view of a modified expander-spacer also in accordance with the invention.

The expander-spacer structure 28 preferably is a resilient circumferential abutment type expander-spacer which does not contact the root of the piston ring groove in operation. An expander-spacer of this type is disclosed in United States Patent No. 2,789,872 issued April 23, 1957 to Holly M. Olson. However, it is to be understood that the structure of the invention is applicable to other forms of expander-spacers, oil ring assemblies and pistons which for purposes of brevity are not illustrated herein. The expander-spacer illustrated herein is of the Olson type and comprises a one-piece spring member formed from flat metal ribbon stock into a generally annular, parted configuration which is radially corrugated to provide alternate series of inner and outer crowns 28a and 28b (FIG. 4). Oil venting slots 28c are provided in the generally radially extending flexing portions intermediate inner and outer crowns 28a and 28b. Inner crowns 28a are provided with lips 28d extending respectively from the upper and lower longitudinal edges thereof which engage the inner peripheral edges of rails 24 and 26 to bias the rails radially outward against the cylinder wall.

The invention is essentially characterized by equipping a piston with an oil ring assembly of the type referred to above and providing means to limit or prevent relative rotation between the piston and the rail or rails of the ring assembly, without thereby hindering resilient action of the expander-spacer. This is accomplished by a projection and socket arrangement between the piston and the expander-spacer. Since the particular form of piston 10 described above already contains a socket in the form of drainage slot 10c, the projection is provided on expander-spacer 28. The projection preferably comprises a tab 32 which extends radially inward from the inner crown 28a adjacent one end of the expander-spacer 28. As best seen in FIG. 4, tab 32 is readily formed by stamping a C-shaped cut in crown 28a and then bending the material within the cut radially inward at right angles to the crown. Preferably the inner crown 28a adjacent the other end of expander-spacer 28 is also formed with a tab 34 identical to tab 32. In assembling expander-spacer 28 in oil groove 19, it is positioned so that tabs 32 and 34 project into the lower oil drainage slot 10c. Rails 24 and 26 are then inserted respectively between expander-spacer 28 and the upper and lower sides of oil groove 19 with their parting gaps 30 located in the portion of oil groove 19 having the highest elevation, i.e., substantially adjacent the circumferential center of oil drainage slot 10d.

In operation, the tendency of expander-spacer 28 to rotate relative to piston 10 is limited by the engagement of tabs 32 and 34 with the vertical side edges 10e, 10f (FIG. 2) of oil drainage slot 10c, and thus expander-spacer 28 can only rotate through the circumferential distance between such edges, normally about 90° of rotation. Consequently gaps 30 between the parted ends of rails 24 and 26 likewise remain within the highest 90° region of the oil groove circumference. It is to be understood that tabs 32, 34 may project into any other suitably shaped opening in the surfaces of oil groove 19, such as the opening of slot 10d located in the vertical bottom surface 19a of oil groove 19.

A modified form of projection is shown in FIG. 5 which comprises a tab 36 which also extends radially inward from the inner crown 28a adjacent one end of expander-spacer 28. Tab 36 differs from tab 32 in that it extends from crown 28a at the side thereof which is furthermost from the end of expander-spacer 28. Also, tab 36 is shorter in length than tab 32 so that it does not extend into oil drainage slot 10c when ring assembly 18 is in the free state in oil groove 19 (i.e., the uncompressed condition thereof when piston 10 is out of the cylinder 12). Hence, a ring assembly utilizing short tabs 36 may be rotated relative to the piston and must be aligned as above described as it is being inserted in the cylinder. After such an assembly is compressed by the cylinder wall, tabs 36 extend into slot 10c so as to engage side edges 10e, 10f of slot 10c to limit rotation of the assembly. In contrast, the longer tabs 32 and 34 limit rotation both in the free state of ring assembly 18 and after the same is compressed by the cylinder wall.

Figure 6:
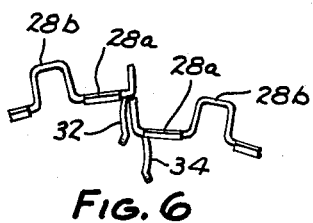
FIG. 6 is an enlarged fragmentary plan view of the ends of the expander-spacer of FIG. 2 illustrating a misaligned condition.

While only one tab 32 or 36 need be provided on an expander-spacer 28 in order to maintain its angular registry with the piston, it is preferred that a pair of tabs 32, 34 be provided so as to reduce the possibility of the abutting ends of expander-spacer 28 becoming hooked together during installation or operation of oil ring assembly 18. Thus, if one end of expander-spacer 28 becomes radially offset with respect to the other end so that such ends are misaligned as, for example, illustrated in FIG. 6, tab 32 will then prevent such one end from passing beyond the inner crown 28a adjacent the other end and hooking into one of the outer crowns 28b inwardly of such other end. This additional function of the tabs is important since if overlap should occur in conventional prior art oil rings, it becomes extremely difficult to insert the piston assembly into the cylinder bore due to the radial misalignment of the oil ring assembly. With the oil ring assembly of the invention, if an overlap condition should somehow occur, it is impossible to get the assembly into the cylinder bore due to the accumulation of the dimensions of tabs 32 and 34 and the crowns in an overlapped assembly. Thus improper assembly is made readily apparent and can be corrected at once, whereas with the prior art assemblies this condition may go unrecognized and not be discovered until faulty engine operation dictates an examination.

We claim:

1. An oil ring assembly for use in a piston having an oil ring groove with an oil drainage opening in one face thereof with the dimension of said opening in the direction of the circumference of said groove being less than that of said one face, said ring assembly including in combination an annular parted rail initially assembled in said groove with the parting gap thereof located in the circumferential portion of said groove having the lowest rate of oil accumulation, and expander-spacer means disposed in said groove in operative engagement with said rail for biasing said rail into an oil sealing position in said groove, said expander-spacer means having means projecting therefrom into said opening in said groove so that rotation of said expander-spacer means relative to said piston causes said projecting means to move circumferentially in said opening to thereby reduce clogging of said opening and so that rotation of said expander-spacer means is limited to said dimension of said opening in the direction of the circumference of said groove whereby the parting gap of said rail is maintained in its initial assembled position within the range of such dimension during operation of the piston to thereby minimize leakage of oil through said gap.

2. The combination as set forth in claim 1 wherein said projecting means extends radially inward from said expander-spacer means a distance sufficient to enter said oil drainage opening in said one face of the oil groove when said ring assembly is in its free state in said oil groove so that rotation of said ring assembly relative to said piston is limited in said oil groove prior to said piston being received in a cylinder.

3. The combination as set forth in claim 1 wherein said expander-spacer is radially corrugated to provide alternate series of inner and outer crowns and generally radial flexing portions intermediate said crowns, and wherein said projecting means includes a tab integral with and stamped from the inner crown adjacent one end of said expander-spacer and adapted to serve as a circumferential stop for the other end thereof when said other end is radially misaligned inwardly of said one end.

4. An oil ring assembly for use in a piston having an oil ring groove with a recess in one face thereof with the dimension of said recess in the direction of the circumference of said groove being less than that of said one face, said ring assembly including in combination an annular parted rail initially assembled in said oil groove with the parting gap thereof located in the circumferential portion of said oil groove having the lowest rate of oil accumulation, and expander-spacer means disposed in said oil groove in operative engagement with said rail for biasing said rail into an oil sealing position in said oil groove, said expander-spacer means having projecting means extending therefrom into said recess in said oil groove so that rotation of said expander-spacer means is limited to said dimension of said recess in the direction of the circumference of said groove whereby the parting gap of said rail is maintained in its initial assembled position within the range of such dimension during operation of the piston to thereby minimize leakage of oil through said gap, said expander-spacer being radially corrugated to provide alternate series of inner and outer crowns and generally radial flexing portions intermediate said crowns, said projection means including a tab integral with and stamped from the inner crown adjacent one end of said expander-spacer and another tab integral with and stamped from the inner crown adjacent the other end of said expander-spacer, said tabs extending generally radially inwardly from said inner crowns and individually serving as stops for the respective opposite parted ends of said expander-spacer when said ends are radially misaligned with one another thereby preventing jamming of said expander-spacer during installation and operation thereof in said oil control ring assembly as well as angularly registering said assembly with respect to said piston.

5. An expander-spacer of the circumferentially self-supporting circumferential abutment type adapted for positioning and circumferentially expanding, annular, parted rail means disposed in an oil groove of a piston, said piston having an oil drainage passage communicating with said oil groove, said expander-spacer comprising a generally circular, parted resilient member which is radially corrugated to provide alternate series of inner and outer crowns and generally radial flexing portions intermediate said crowns, one of said crowns having an integral tab extending inwardly therefrom and adapted to project into said passage in the piston, said tab being dimensioned relative to the passage for circumferential deposit-cleaning movement therein upon rotation of said expander-spacer relative to said piston, said tab serving to limit said relative rotation to the extent of said cleaning movement so that the rail means is likewise limited in its rotation from the initial assembled position thereof with respect to said piston.

6. In a piston operable in a cylinder normally oriented with its axis at an angle to the vertical and having a circumferential oil groove defined by upper, lower and back surfaces and further having an oil drainage passage extending radially from the back surface of the oil groove into the piston, an oil control ring assembly including in combination, a pair of annular flat rails each having a parting gap and disposed individually adjacent the upper and lower surfaces of the oil groove with the parting gaps of said rails located substantially at the highest elevation in the oil groove, and an annular, parted expander-spacer disposed in the oil groove with a portion thereof located between said rails and in operative engagement therewith for spacing the same axially apart and with a portion thereof located inwardly of said rails and in operative engagement therewith for urging the same radially outward, said expander-spacer having projection means extending radially inwardly therefrom into said oil drainage passage beyond the diameter of the back surface of the oil groove so that rotation of said expander-spacer is limited to the distance across the opening of said oil passage taken in the direction of the circumference of the oil groove whereby the parting gaps of said rails are maintained within the range of said distance at the highest elevation in the oil groove during operation of said piston to thereby minimize leakage of oil past said ring assembly.

7. An expander-spacer for supporting, spacing and outwardly pressing a piston ring, said expander-spacer comprising a generally circular resilient member having parting ends and radial corrugations intermediate said ends alternately disposed inwardly and outwardly of the median diameter of said expander-spacer and adapted to flex circumferentially for developing radial thrust forces on said ring, said parting ends extending at least in part generally radially between the inner and outer diameters of said expander-spacer and adapted to circumferentially abut one another in the normal operative condition of said expander-spacer to thereby circumferentially support said expander-spacer for developing said radial thrust forces, and means extending from said expander-spacer generally radially inwardly beyond the inner diameter thereof adjacent one of said ends adapted to serve as a circumferential stop for the other of said ends when it is radially misaligned inwardly of said one end to thereby help prevent circumferential overlap of the radial corrugations adjacent said ends.

8. The article set forth in claim 7 including further means extending generally radially from said expander-spacer adjacent the other of said ends thereof adapted to serve as a stop for said one end of said expander-spacer when said ends are radially misaligned with one another.

9. The article set forth in claim 8 wherein said first mentioned stop means comprises a tab integral with the radially inwardly disposed corrugation adjacent said one end and extending inwardly therefrom, and wherein said last mentioned stop means comprises a tab integral with the radially inwardly disposed corrugation adjacent said other end and extending inwardly therefrom.

10. The article set forth in claim 7 wherein said means comprises a tab integral with one said radially inwardly disposed corrugations and extending inwardly therefrom.

11. In combination, a piston for use in an engine cylinder normally oriented with its axis at an angle to the vertical, said piston having a circumferential oil ring groove therein, an oil ring disposed in said groove and having a parting gap located substantially in the area of highest elevation of said groove and an annular expander disposed in said groove and operably engaging said ring for biasing said ring into oil-sealing engagement with the cylinder and for restricting rotation of said ring relative to said expander, said piston having an oil drainage opening in said groove, said expander having means projecting therefrom into said opening for loose engagement with said piston, said projecting means being dimensioned for circumferential deposit-cleaning movement in said opening upon rotation of said expander relative to said piston in response to piston reciprocation in the cylinder, said relative rotation being limited to the extent of said cleaning movement by engagement of said projecting means with said piston to thereby maintain the parting gap of said ring in said high elevation area of said groove.

12. The combination set forth in claim 11 wherein said oil drainage opening is disposed in the lowest elevation area of said groove.

13. The combination set forth in claim 11 wherein said expander comprises a radially corrugated member having parting ends adapted to circumferentially abut one another so that said expander is circumferentially self-supporting independently of said piston for developing radial thrust forces on said ring, said projecting means being located adjacent said parting ends and forming circumferential stop means for said ends when the same are misaligned with one another to thereby prevent circumferential overlap of the ends.

References Cited in the file of this patent

UNITED STATES PATENTS

| | | |
|---|---|---|
| 1,198,993 | Birkigt | Sept. 19, 1916 |
| 1,322,294 | Eggers | Nov. 18, 1919 |
| 1,791,280 | Moorhouse | Feb. 3, 1931 |
| 2,192,926 | Meyer | Mar. 12, 1940 |
| 2,283,056 | Guardiola | May 12, 1942 |
| 2,300,518 | Phillips | Nov. 3, 1942 |
| 2,447,385 | Adams | Aug. 17, 1948 |
| 2,789,872 | Olson | Apr. 23, 1957 |
| 2,907,615 | Duesenberg | Oct. 6, 1959 |
| 2,985,148 | Caris | May 23, 1961 |